Oct. 17, 1967      A. GENTZEL      3,346,996

TOOL HOLDING DEVICE

Filed Nov. 10, 1964      2 Sheets-Sheet 1

INVENTOR
ALFRED GENTZEL

3,346,996
TOOL HOLDING DEVICE
Alfred Gentzel, Murray Hill, N.J.
(R.D. 3, Box 705–A, Flemington, N.J. 08822)
Filed Nov. 10, 1964, Ser. No. 410,320
6 Claims. (Cl. 51—225)

This invention relates to tool holding devices, and more particularly, to multiple purpose tool holding devices and tool attachments.

Large machine shops normally include a rather large number of tools, each of which is used for a separate function that is more or less incidental to the machining and manufacturing of work products. For example, "radius dress" machines are used to grind the periphery of a grinding wheel to a desired curved shape, while a separate "angle dress" machine is used to grind the peripheries of other grinding wheels at an angle. Separate machines are often used for sharpening the edges of end mill flutes and for grinding the ends of the end mills. Still other machines are used for various indexing functions; that is, to orient a work piece at successive predetermined angular locations. Each of these tools may be quite expensive, and their combined cost is often prohibitive for small machine shops. Although machines have been devised which combine certain of the above functions, workers in small machine shops typically discard dull end mills and badly worn grinding wheels, or else send them to large or specialized shops for renovation.

Accordingly, it is an object of this invention to provide a single, inexpensive, multipurpose tool which is capable of performing the above functions, and other functions as well.

It is another object of this invention to provide a tool holding device which is capable of performing a variety of functions in conjunction with various attachments that can be fitted thereto.

It is another object of this invention to provide an inexpensive tool holding device that can be conveniently and simply adapted to perform a number of different functions including radius dressing, angle dressing, indexing, end mill flute sharpening, end mill end sharpening, and other functions.

These and other objects of my invention are attained in a tool holding device comprising a housing having a central bore which contains a cylindrical spindle. A collet is included within the spindle for holding at one end various tools and other attachments. The housing is rotatably mounted on a vertical supporting wall of a base which rests on a flat supporting surface. A number of indexing apertures through the supporting wall surround the rotatable mount and register with corresponding indexing apertures in the housing when the housing is located at various angles with respect to the flat supporting surface. Indexing pins can be inserted through the indexing apertures to lock the housing at any of these various angles. Further, a mounting screw is used which can be tightened to lock the housing at various intermediate angles if so desired.

The spindle extends out from opposite ends of the housing and has a handle at one end for controlling its longitudinal and rotational motion. A number of equally spaced radial indexing apertures are located around the periphery of the spindle at a position which corresponds to that of an indexing aperture which extends through the housing. An indexing pin may be inserted through the housing aperture into one of the spindle apertures to position the spindle at a desired angular location and lock it against longitudinal and rotational motion. Two removable collars are provided which are adapted to clamp tightly around the spindle. If only the longitudinal motion of the spindle is to be restricted, the collars are abutted against the end surfaces of the housing when they are tightened around the spindle. With the collars in this position the spindle is free to rotate but not to move longitudinally.

The front surface of the housing contains an aperture into which a lock pin may be inserted. One of the collars includes a slot with which the lock pin engages. With the collar removed a substantial distance from the end surface of the housing, the lock pin restrains rotation of the spindle but does not interfere with longitudinal motion of the spindle.

In accordance with the foregoing features, the housing can be rotated in a vertical plane and locked in any of various positions, while the spindle can be rotated around the central axis of the bore and be locked in any desired angular position with respect thereto. Additionally, the spindle is free to move longitudinally within the bore or be locked against such longitudinal motion if so desired. These features can be used in various combinations in connection with various attachments to perform a number of machining functions. For example, the attachment may comprise a supporting arm that extends at an angle from the collar and to support a diamond grinding tool. With the collar abutting the housing end surfaces, the spindle is locked against longitudinal motion but not rotational motion. Hence the spindle can be rotated to drive the cutting tool through an arc as is required for radius dressing of a grinding wheel. As another example, the housing may be locked at an appropriate vertical angle corresponding to the desired angle at which the periphery of the grinding wheel is to be ground. The spindle is then locked by the locking pin against rotational motion but is free to move longitudinally. A proper diamond cutting tool attached to the collet can then be moved back and forth at a proper angle for angle dressing of the grinding wheel. Various other attachments and uses for my multi-purpose tool holding device will be described in detail later.

In accordance with another feature of the invention, the spindle is contained within the housing bore by two raised bearing surfaces at opposite ends of the bore. A slot extends from the bore to the outer surface of the housing along one side of the housing. The bearing surfaces are clamped around the spindle by a compression screw which is located at the longitudinal center of the housing and which extends transversely across the slot. The clamping pressure of each bearing surface is controlled by jack screws at opposite ends of the housing which extend transversely across the slot to bear against one of the surfaces defining the slot. In order to relieve the pressure of one of the bearing surfaces on the spindle, one merely screws in the jack screw adjacent that surface to spread the slot slightly. By adjusting the compression screw and jack screws one effectively can insure appropriate clamping pressure by each of the bearing surfaces in spite of the fact that one of the bearing surfaces may become more worn than the other.

These and other objects, features, and advantages of my invention will be more clearly understood from a consideration of the following detailed description, taken in conjunction with the accompanying drawing, in which.

Figure 1:
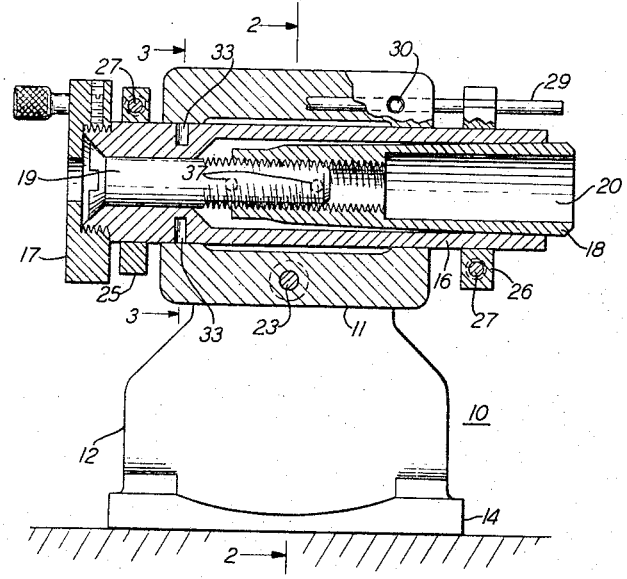
FIG. 1 is a sectional view of a tool holding device in accordance with my invention.
Figure 2:
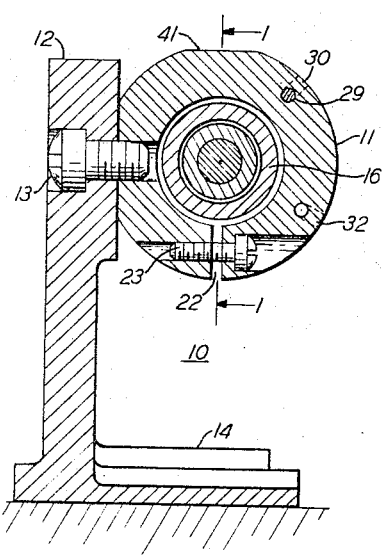
FIG. 2 is a view taken along lines 2—2 of FIG. 1.

Referring now to FIGS. 1 and 2, there is shown a tool holding device 10 comprising a hollow, substantially cylindrical housing 11 which is attached to a vertical support wall 12 by a compression mounting screw 13. The support wall is preferably integral with a base 14 which is bolted or otherwise attached to a flat supporting surface. Rotatably mounted within a central bore in the housing is a cylindrical spindle 16 that extends from both ends of the housing. A handle 17 is attached at one end of the spindle for controlling rotational and axial or longitudinal movement of the spindle within the housing. Included within the spindle is a tapered collet 18 having a drawing screw 19 at one end and an end opening at the other end for holding a tool or other attachment. When the drawing screw 19 is threaded into the collet to draw the collet into the spindle, the collet is compressed, and a proper attachment that has been inserted into the end opening 20 is clamped and retained tightly.

Figure 3:
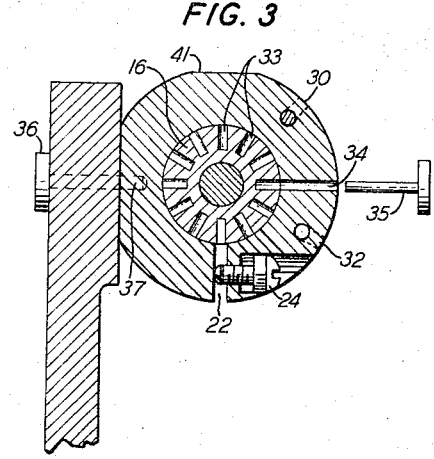
FIG. 3 is a view taken along lines 3—3 of FIG. 2.
Figure 5:
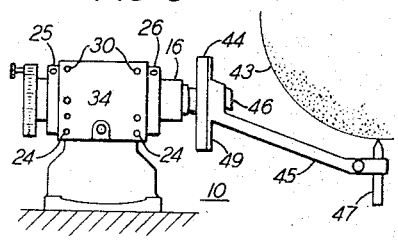

In order to minimize friction, the spindle contacts the housing only at annular raised bearing surfaces at opposite ends of the bore, as can best be seen in FIG. 1. A radial slot 22 extends from the bore to the outer surface of the housing along the bottom side of the housing as shown in FIGS. 2 and 3. After the spindle is inserted into the bore, the annular bearing surfaces are clamped around the spindle by tightening a compression screw 23 located at the longitudinal center of the housing which draws the opposite sides of the slot together. Jack screws, 24, shown in FIG. 5 are located at opposite ends of the housing for the purpose of adjusting the clasping pressure of each of the bearing surfaces on the spindle. As shown in FIG. 3, the jack screws 24 extend across slot 22 to abut against one of the surfaces defining the slot, so that when one of the screws is threaded against the abutting surface, it spreads the slot to relieve bearing pressure on the spindle. Individual adjustment of bearing pressure in this manner is convenient for compensating for differential wear of the two bearing surfaces.

Surrounding opposite ends of the spindle are two removable collars 25 and 26. The collars are clamped around the spindle by clamping screws 27 which permit their longitudinal position on the spindle to be adjusted. Collar 26 contains a slot for receiving a locking pin 29. Pin 29 is removably held within a housing aperture by set screws 30 shown in FIGS. 1, 2, and 5. Alternatively, pin 29 may extend through a housing aperture 31 shown in FIG. 2 and be removably held in place by set screws 32 shown in FIGS. 2 and 6. With the pin 29 engaging the slot of collar 26 as shown in FIG. 1, rotational motion of the spindle is prohibited, but longitudinal motion of the spindle is permitted. If the pin 29 were removed and if collars 25 and 26 were abutted against the end surfaces of the housing 11, longitudinal motion of the spindle would be prohibited, while permitting rotational motion.

Figure 9:
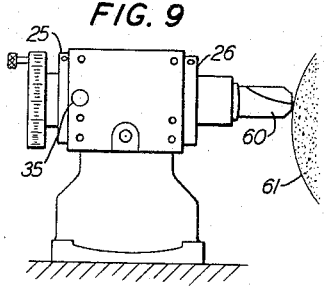
Figure 7:
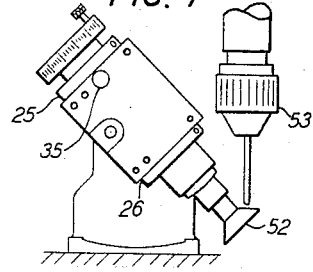

Located around the periphery of spindle 16 near its handle end are a plurality of indexing apertures 33, best shown in FIG. 3. Extending through one side of the housing is an indexing aperture 34, shown in FIGS. 3 and 5. When one of the indexing apertures 33 is in registration with indexing aperture 34, the spindle 16 may be locked at that precise angular position by inserting an indexing pin 35 through registered apertures 34 and 33, as is illustrated in FIGS. 7 and 9. Preferably, the spindle contains twelve apertures 33 placed at thirty degree intervals around its periphery. Collar 25 contains twelve indexing markings and is appropriately located to orient the markings in registration with the indexing apertures 33. The angular rotation of the spindle can therefore conveniently be determined by observing the movement of the markings. For example, if the indexing pin 35 is adjacent the number 2 when it is initially inserted, a clockwise movement of 90 degrees is insured by removing the pin, rotating the spindle to the number 5, and then reinserting the pin. It is to be noted that indexing pin 35 prohibits axial, as well as rotational, motion of the spindle.

Figure 4:
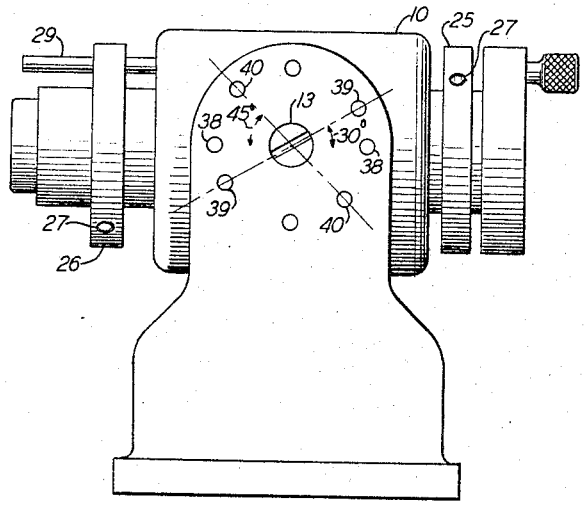
FIGS. 4 through 10 are side views of the tool holding device of FIG. 1 together with various attachments which illustrate various uses to which the device of FIG. 1 may be put.

Referring to FIGS. 2 and 4, it can be seen that if mounting screw 13 is not tightened the housing 11 is free to rotate in a vertical plane. Located in a circle around the mounting screw are a plurality of indexing apertures for locking the housing at a desired vertical angle. Two corresponding indexing apertures 37, shown schematically on FIG. 1, extend into the spindle 16 on opposite sides of the mounting screw. With the spindle parallel with the supporting surface as shown in FIG. 4, the spindle apertures are in registration with housing aperture 38. Indexing pins inserted through apertures 38 and spindle apertures 37 therefore lock the housing in the parallel or zero degree angle shown in FIG. 4. One of the indexing pins 36 is shown in FIG. 3. The remaining housing apertures are arranged in pairs that are located at angles of 30°, 45°, and 90°, respectively, with respect to the supporting surface. For example, if the housing is to be tilted at a thirty degree angle, the spindle apertures are oriented to be in registration with housing apertures 39 and the indexing pins are inserted therein. If a forty-five degree angle is desired, the indexing pins are inserted through housing apertures 40 and the spindle apertures.

If an angle other than 30, 45, or 90 degrees is desired, the housing is rotated to a desired angle and compression mounting screw 13 is tightened to compress the housing to side wall 12 and lock it in position. Experiment has shown that with a flat surface of the housing bearing tightly against the flat side wall as shown in FIG. 2, the single mounting screw is effective for locking the housing in precise position, in spite of stresses incurred during continued use. A flat top surface 41 is provided on the housing on which one leg of a protractor can be mounted for determining a precise angular position of the housing. The housing and spindle apertures aid the operator in quickly locking the housing at the more commonly used angles without the necessity of a protractor.

From the foregoing, it can be seen that my tool holding device is capable of controlling the motion of a tool attached to the collet in a number of different ways. The device can give any combination of rotational motion, rotational indexing motion, longitudinal motion, vertical movement, and vertical indexing movement. The adaptation of the device to give a desired motion or combination of motions is easily and quickly accomplished by inserting the desired indexing pins or collars. FIGS. 5 through 10 illustrate various functions for which my device can be used.

The purpose of the arrangement shown in FIG. 5 is to radius dress a grinding wheel 43; that is, to grind the periphery of the wheel to a desired arc shape. The attachment which is fitted to the collet within spindle 16 comprises a collet adapter 44, a radius dress arm 45 mounted on the collet adapter leg by screw 46, and diamond cutting tool 47 clamped on the end of the radius dress arm. Because the radius dress arm extends at an angle from the spindle, the diamond tool describes a wide arc when the spindle is rotated. The tool therefore grinds the periphery of the grinding wheel at a desired arc when the grinding is rotated at a high speed. The radius dress arm can be moved up or down along a guide 49 on the collet adapter to describe arcs of different radii.

In the device of FIG. 5, the housing must be locked against vertical rotation and is preferably locked in a zero degree position by inserting indexing pins through the apertures 38 of FIG. 4. Further, longitudinal motion of the spindle should be restricted without interfering with its rotational motion. This is accomplished by collars 25 and 26 which abut against end surfaces of the housing.

Figure 6:
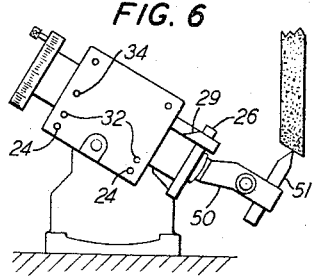

In the embodiment of FIG. 6 my device is used for angle dressing a grinding wheel; that is, for grinding the periphery of a grinding wheel at a desired angle. The collar attachment here comprises an angle dressing arm 50 to which a diamond cutting tool 51 is clamped. The diamond cutting tool 51 may be identical to diamond cutting tool 47 of FIG. 5 for economy of parts. For cutting the grinding wheel at a 30 degree angle the housing is rotated 30 degrees and indexing pins are inserted through the indexing apertures 39 of FIG. 4. The grinding is accomplished by moving the spindle back and forth as the grinding wheel is rapidly rotated. Rotational motion of the spindle is prohibited by pin 29 which extends through the slot in collar 26.

FIG. 7 illustrates an indexing function for which my device can be used. In this embodiment, the spindle holds a work piece 52 in which spaced holes are to be drilled by a drill press 53. If six holes, each 60 degrees apart are to be drilled in the piece 52, the pin 35 is first inserted in one of the spindle apertures 33 as shown in FIG. 3. After the first hole is drilled, the spindle is rotated to the second succeeding aperture 23 and the pin 35 is reinserted, thus insuring a precise 60 degree rotation of the piece 52. This operation is repeated until all six equally spaced holes have been drilled. Collar 25 preferably includes indexing numbers as shown in FIG. 4 for aiding the operator in locating the proper spindle aperture for each successive drilling operation. Collar 25 also cooperates with collar 26 to prohibit the longitudinal motion of the spindle as the spindle is being rotated between successive positions. It can be appreciated that this embodiment can be used for numerous other indexing functions, such as cutting regularly spaced slots in a work piece.

Figure 8:
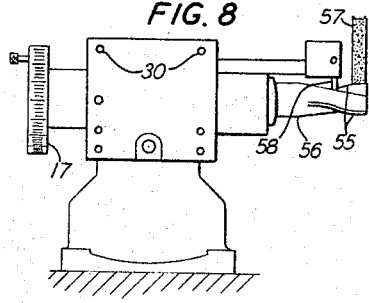

FIG. 8 shows the adaptation of my device for the sharpening of spiral flutes 55 of an end mill 56. The flutes are sharpened by a rotating grinding wheel 57. It is important that the flutes be maintained at a proper angle with respect to grinding wheel 57 so that their edges will be sharpened properly. For this purpose a finger guide 58 is provided which extends into the housing and is held in place by set screws 30. The flute to be sharpened is initially arranged such that it bears against finger 58 when it is at a proper angle with respect to the grinding wheel 57. The flute is then advanced past the grinding wheel 57 by abutting it firmly against finger 58 while advancing it by means of handle 17. The alternate aperture 31 shown in FIGS. 2 and 3 is provided for insertion of the finger 58 if that position would be convenient for the flute sharpening operation. End mill flute sharpening is an important function of my device because conventional flute sharpening operation. End mill flute sharpening is sharpening operation the housing is locked in a position parallel with the supporting surface.

FIG. 9 shows how my device is adapted for sharpening the ends of end mills. The housing is locked in its parallel position and an end mill 60 is inserted into the collet. The end mill is inserted such that the end of one of its flutes is in a proper position for sharpening by a rotating grinding wheel 61 when the indexing pin 35 is inserted into one of the spindle apertures. The end of the flute is then sharpened by moving the grinding wheel 61 against the end mill. When the first flute has been sharpened, indexing pin 35 is removed and the spindle is rotated through a proper arc to bring a successive flute in proper position for sharpening. For example, if the end mill has two flutes, the spindle is rotated through 180 degrees or past six of the spindle apertures shown in FIG. 3 before the indexing pin 35 is reinserted. If the end mill has three flutes, the pin 35 would be inserted in every fourth spindle aperture 33. Again, the indexing numbers on collar 25 of FIG. 4 are of aid to the operator. Collars 25 and 26 prohibit longitudinal motion of the spindle while the spindle is being turned between sharpening operations.

Figure 10:
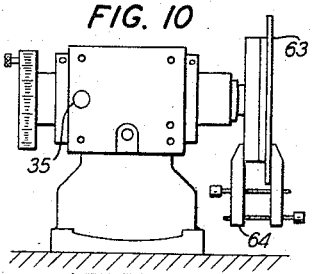

FIG. 10 shows my device being used for "lay-out" work. A work piece 63 is clamped by a clamp 64 to the collet adapter 44 which is also shown in FIG. 5. Indexing markings can be made on the work piece by any of numerous marking devices when the spindle is rotated by removing indexing pin 35. The twelve indexing spindle apertures 33 shown in FIG. 3 are particularly useful for numerous indexing functions because they can be used to precisely segment any work piece into two, three, four, or six to twelve equal arcs.

From the foregoing, it can be appreciated that the tool holding device shown in FIGS. 1 through 4 is very useful in that it can be adapted to perform numerous functions that have heretofore required several separate and relatively expensive machines. It can be seen from the simplicity of the structure of my tool holding device that it can be manufactured at less expense than most of the individual conventional tools for performing any one of the separate functions shown in FIGS. 5 through 10. The various features shown, however, are to be considered as being only illustrative of my invention. Numerous other arrangements may be made by those skilled in the art without departing from the spirit and scope of the invention.

What is claimed is:
1. A holding device comprising:
    a housing having a substantially cylindrical bore;
    a cylindrical hollow spindle rotatably mounted within said bore and extending beyond opposite ends of the housing;
    means for holding a tool or other attachment comprising a collet contained within said spindle and extending from a front end of the spindle;
    a handle attached to a rear end of the spindle;
    said housing being rotatably mounted on a support wall which is substantially perpendicular to a flat supporting surface;
    means for locking said housing to the support wall of any of a plurality of positions, whereby the housing may be oriented at any of a number of predetermined angles with respect to said flat surface;
    a first indexing aperture extending through one side of the housing;
    a plurality of second indexing apertures located around the periphery of the spindle;
    first means for locking the spindle against rotation within said bore comprising a first indexing pin which is adapted to extend through the first indexing aperture and any of the second indexing apertures, whereby the spindle may be oriented within said bore at any of a number of angular positions;
    means for restricting longitudinal motion of said spindle comprising first and second collars adapted to surround front and rear end regions of said spindle and to abut respectively against front and rear end surfaces of said housing;
    a third aperture in the front surface of the housing;
    a slot in the first collar;
    and second means for locking the spindle against rotational motion within the bore while permitting longitudinal motion of the spindle comprising a second pin adapted to extend through said third aperture and the slot.

2. The holding device of claim 1 wherein:
    the housing includes a slot extending from the bore to the outer surface along one side thereof;
    raised bearing surfaces at opposite ends of the bore for clasping said spindle;
    means for tightening both bearing surfaces around said spindle comprising a first compression screw that is located at the longitudinal center of the housing and which extends transversely across the slot;
    and means for adjusting the clasping pressure of each bearing comprising jack screws located near opposite ends of the housing which extend across the slot to bear on one surface defining the slot.

3. The tool holding device of claim 2 wherein:
    the means for locking the housing to the support wall comprises a second compression screw extending through the support wall into the housing, a plurality of fourth indexing apertures through the support wall arranged along a circle around the second compression screw, fifth indexing apertures extending into the spindle and located on opposite sides of the compression screw, and third indexing pins adapted to extend simultaneously through the fourth and fifth indexing apertures;

said fourth indexing apertures being arranged such that a line through at least two apertures is parallel to the central axis of the housing when the housing is rotated at angles of 0 degrees, 30 degrees, 45 degrees and 90 degrees with respect to said flat surfaces;

said compression screw comprising means for locking the housing to the support wall at angular positions intermediate the last-mentioned angular positions.

4. A tool holding device comprising:
a housing having a substantially cylindrical central bore;
a spindle extending through said bore;
means at one end of said spindle for holding a tool;
a slot extending from the bore to the outer surface of the housing along one side of the housing;
raised bearing surfaces at opposite ends of soid bore for clasping the spindle;
means for tightening both bearing surfaces around the spindle comprising a compression screw located at the longitudinal center of the housing which extends transversely across the slot;
and means for adjusting the clasping pressure of each bearing on the spindle comprising jack screws on opposite ends of the housing which extend across the slot to bear on one surface defining the slot.

5. A multipurpose tool comprising:
a hollow substantially cylindrical housing having a central axis;
one side of said housing being rotatably mounted on a vertical support wall;
said support wall being mounted on a base which is supported on a flat horizontal surface;
first indexing apertures extending through the support wall;
second indexing apertures extending into the side of the housing adjacent the support wall;
means for restricting rotation of said housing comprising at least one removable first index pin which is adapted to extend simultaneously through one of said first apertures and one of said second apertures;
a hollow cylindrical spindle rotatably mounted within the cylindrical housing which is longer than the housing;
said spindle containing a collet at one end thereof for holding an attachment or work piece;
said spindle including a handle at the other end thereof for controlling longitudinal and rotational motion of the spindle;
a third indexing aperture radially extending through a side of the housing;
a single array of only fourth indexing apertures extending radially through said spindle;
means for restricting rotational and longitudinal motion of said spindle comprising a second removable indexing pin which is adapted to extend simultaneously through said third and fourth indexing apertures;
means for limiting and for prohibiting longitudinal motion of said spindle comprising removable collars which are adapted to surround opposite end regions of said spindle and to bear against opposite end surfaces of the housing;
an aperture in a front end surface of the housing;
a slot in the collar which is adapted to surround the front end portion of the spindle;
and means for restricting rotational motion of said spindle comprising a removable pin which is adapted to extend simultaneously through the aperture and the collar slot.

6. A multipurpose tool comprising:
a hollow substantially cylindrical housing having a central axis;
one side of said housing being rotatably mounted on a vertical support wall;
said support wall being mounted on a base which is supported on a flat horizontal surface;
first indexing apertures extending through the support wall;
second indexing apertures extending into the side of the housing adjacent the support wall;
means for restricting rotation of said housing comprising at least one removable first index pin which is adapted to extend simultaneously through one of said first apertures and one of said second apertures;
a hollow cylindrical spindle rotatably mounted within the cylindrical housing which is longer than the housing;
said spindle containing a collet at one end thereof for holding an attachment or work piece;
said spindle including a handle at the other end thereof for controlling longitudinal and rotational motion of the spindle;
a third indexing aperture radially extending through a side of the housing;
a single array of only fourth indexing apertures extending radially through said spindle;
means for restricting rotational and longitudinal motion of said spindle comprising a second removable indexing pin which is adapted to extend simultaneously through said third and fourth indexing apertures;
said attachment comprising an angle dressing arm having a dressing tool at one end;
said first indexing pin comprising means for locating the housing along an axis at an angle with respect to the flat support surface;
a front aperture in a front end surface of the housing;
a collar secured to a front end region of the spindle;
and means prohibiting rotation of said spindle comprising a removable pin that extends through a slot in the collar and into said front aperture.

References Cited

UNITED STATES PATENTS

| | | | |
|---|---|---|---|
| 2,040,709 | 5/1936 | Pruitt | 51—216 X |
| 2,332,510 | 10/1943 | Franzen | 51—225 |
| 2,375,052 | 5/1945 | Umbdenstock | 51—225 |
| 2,428,786 | 10/1947 | Dahl | 125—11 |
| 2,607,105 | 8/1952 | Barkus. | |
| 2,690,037 | 9/1954 | Meyer | 51—225 |
| 3,117,399 | 1/1964 | Schoeppell | 51—225 X |
| 3,137,288 | 6/1964 | Soulios | 125—11 |
| 3,187,737 | 6/1965 | Oscar | 125—11 |

FOREIGN PATENTS

| | | |
|---|---|---|
| 9,058 | 5/1889 | Great Britain. |

HAROLD D. WHITEHEAD, *Primary Examiner.*